US008370124B1

(12) United States Patent
Gold et al.

(10) Patent No.: US 8,370,124 B1
(45) Date of Patent: Feb. 5, 2013

(54) HIGH FIDELITY TIME DOMAIN FOR SPACECRAFT EMULATION SYSTEMS

(75) Inventors: Jeffrey J. Gold, Rancho Palos Verdes, CA (US); John D. Haskell, Torrance, CA (US); David L. Koza, Lakewood, CA (US); Michael J. Surace, Rancho Palos Verdes, CA (US); Steven R. Zammit, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 3608 days.

(21) Appl. No.: 09/597,705

(22) Filed: Jun. 16, 2000

(51) Int. Cl.
*G06G 7/48* (2006.01)
*G06F 9/455* (2006.01)
*G06F 1/12* (2006.01)
*G01C 17/38* (2006.01)
*G01C 25/00* (2006.01)
*G01L 27/00* (2006.01)
*G01K 19/00* (2006.01)
*G01G 7/00* (2006.01)

(52) U.S. Cl. .............. 703/23; 700/6; 700/8; 700/25; 700/26; 700/28; 702/94; 702/95; 702/96; 702/97; 702/98; 702/99; 702/173; 702/174; 702/175; 713/400

(58) Field of Classification Search .......... 702/94–99, 702/173–175; 703/6, 23, 25, 26, 28; 713/400; 701/14–16; 244/159, 160; 714/703
See application file for complete search history.

(56) References Cited

U.S. PATENT DOCUMENTS

| 5,285,111 | A | | 2/1994 | Sherman | 290/40 |
| 5,563,794 | A | * | 10/1996 | Cosner et al. | 701/13 |
| 5,656,921 | A | | 8/1997 | Farrall | 320/40 |
| 5,833,570 | A | | 11/1998 | Tabata et al. | 477/20 |
| 5,841,201 | A | | 11/1998 | Tabata et al. | 290/406 |
| 5,928,301 | A | | 7/1999 | Soga et al. | 701/51 |
| 2004/0258024 | A1 | * | 12/2004 | Tiedemann et al. | 370/332 |

OTHER PUBLICATIONS

Steve Zammit. Control and Dynamics Simulation Facility at Hughes Space and Communications. Hughes Space and Communications Company. Aug. 1997.*

* cited by examiner

*Primary Examiner* — John R. Cottingham
*Assistant Examiner* — Thomas Stevens
(74) *Attorney, Agent, or Firm* — Terje Gudmestad; Clifford G. Cousins

(57) ABSTRACT

An emulation system includes a central time source generating a time reference and an emulated spacecraft control processor which contains an embedded processor that provides an emulated input/output interface to communicate simulated spacecraft data. The embedded processor processes the simulated spacecraft data and contains a real time clock engine having a real-time clock period. The system further has a first simulation that processes attitude control system data from the emulated spacecraft control processor to simulate an attitude control system of the spacecraft in real-time. The first simulation engine operative to produce sensor data for input to the emulated spacecraft control processor based on the simulated system dynamics and adjusts the real time clock period in response to the time reference.

19 Claims, 2 Drawing Sheets

HIGH FIDELITY TIME DOMAIN FOR SPACECRAFT EMULATION SYSTEMS

TECHNICAL FIELD

The present invention relates generally to spacecraft simulation, and more particularly to a complete spacecraft simulation system that accommodates high fidelity time domain test applications.

BACKGROUND ART

The increasing size and complexity of various spacecraft and associated subsystems therefore have created a need for detailed validation and verification before deployment. Examples of spacecraft subsystems requiring validation and verification include: (i) multiprocessor-based systems which can have complex software architectures; (ii) fault detection, isolation and response systems providing extended autonomous operations; (iii) multiple-articulated payloads and multibody control; (iv) precision payload pointing systems with multiple interacting elements; and (v) sophisticated ground software for automated spacecraft operations.

However, system-level ground testing to verify full system performance of a spacecraft and associated ground system can be costly and/or inadequate. Present implementations of hardware-in-the-loop systems to provide ground testing require special purpose interface hardware and harnessing to create a test environment whereby system hardware or emulations thereof can be integrated with high-fidelity, non-linear, real-time simulations and then instrumented to facilitate verification and validation testing.

Embedded processors and software that constitute various spacecraft subsystems implement asynchronous, real-time processes that require integration and synchronization with real-time processes on the earth. To accommodate nominal operational processes, the space and ground based systems depend upon split second synchronization on the order of microseconds. Spacecraft systems therefore have highly accurate oscillators and clocks while ground systems utilize stratum zero time references. To facilitate adequate testing, it is imperative that the real-time behavior of the systems under test not be compromised. Otherwise, the system under test may yield inaccurate results or become inoperative.

Known implementations of such systems require a substantial amount of effort to achieve some measure of time domain fidelity and must extrapolate test results to achieve some level of verification and validation. Known systems require manual intervention to initialize the system and then periodic tuning to maintain an acceptable level of fidelity relative to the time domain. For instance, the reference simulation system clock had to be initialized by the operator. The resulting simulation was a function of the operator's hand-eye coordination and subject to propagation delays and uncertainties within the operating system. Embedded clocks within the hardware-in-the-loop test environment would then periodically have to be tuned to accommodate their inherent drift and bias as well as the drift and bias of the reference clock. Some of these tuning mechanisms were automated and complex. Others required some human-in-the-loop activity. Thus, known systems employ complex mechanisms and human interaction to adjust time references and clocks in order to achieve a measure of synchronization, sufficient to be able to continue operational testing and perhaps sufficient to extrapolate and evaluate test results.

U.S. Pat. No. 5,808,921 is commonly assigned and was co-invented by the inventor of the present invention. In the '921 patent, multiple circuit board based oscillators were used to keep and synchronize the timing function. Accurate time keeping is desirable to simulate real world situations and the U.S. Pat. No. 5,808,921 has limited functionality because the several oscillators used to create clocks are subject to drift rates and biases that result is system clocks that have marginal accuracy and lack any definitive level of synchronization. Consequently the time domain fidelity of the test environment is marginally sufficient and diminishes over time. As a result, the fidelity of the test environment and the validity of the results are questionable. When involved in long-term test, the degradation often causes premature termination of the testing. U.S. Pat. No. 5,808,921 is hereby incorporated by reference.

It would therefore be desirable to provide an emulation system with improved time domain fidelity to increase the precision and functionality of the test environment and ultimately, the validity and quality of the testing prior to deployment of the operational system.

SUMMARY OF THE INVENTION

It is an object of the present invention to provide a low-cost, high fidelity system for time critical testing a spacecraft and an associated ground system.

It is a further object of the present invention to provide a means to automatically modify the bias and drift of embedded processor (hardware-in-the-loop) clocks to duplicate the precise behavior of operational systems or to investigate operational envelopes.

It is still another object of the present invention to provide an automated system for modifying the emulated spacecraft time reference in a manner that does not perturb testing or invalidate results.

It is still a further object of the present invention to provide a mechanism for synchronizing simulation engines to nearly absolute real time.

It is yet another object of the present invention to provide a means, when necessary, to lock the embedded process time epochs to the simulation engines.

It is yet a further object of the present invention to provide a means to more precisely timestamp data transmitted to external systems.

In accordance with the objects of the present invention, a spacecraft emulation system incorporating a high precision time reference is provided. The system includes an emulated spacecraft control processor which contains an embedded processor that provides an emulated input/output interface to communicate simulated spacecraft data, wherein the embedded processor processes the simulated data. The system includes a first simulation engine which processes the attitude control system command data from the emulated spacecraft control processor to simulate the attitude control system (ACS) of the spacecraft in real-time. The first simulation engine is operative to produce the simulated attitude sensor data for input to the emulated spacecraft control processor based on the simulated system dynamics. The system also includes a second simulation engine which processes the non-ACS subsystems of the spacecraft in real-time, specifically, thermal, power propulsion and payload subsystems. The second simulation engine is operative to produce the simulated non-ACS telemetry data for input to the emulated spacecraft control processor and/or ground segment based on the simulated system dynamics. The second simulation engine is in communication with the embedded processor through a VMEbus connection. Additionally, the system includes an emulated central telemetry and command unit (ECTCU) which processes and distributes telemetry and command data. The system includes an interface manager which provides a conduit for command and telemetry data transferred between the ground control system and the ECTCU. The system includes a Stratum One Server or Time Code Translator to provide a Universal Time reference. The time reference is the central time source for the simulation engines to adjust and skew simulation frames, embedded clocks and time-stamping mechanisms.

Embodiments of the present invention are advantageous in that the simulation engines may allow the determination and modification of bias and drift factors to facilitate an exact imitation of real operational systems as well as to facilitate testing of off-nominal systems.

These and other features, aspects, and embodiments of the present invention will become better understood with regard to the following description, appended claims, and accompanying drawings.

BEST MODE FOR CARRYING OUT THE INVENTION

Figure 1:
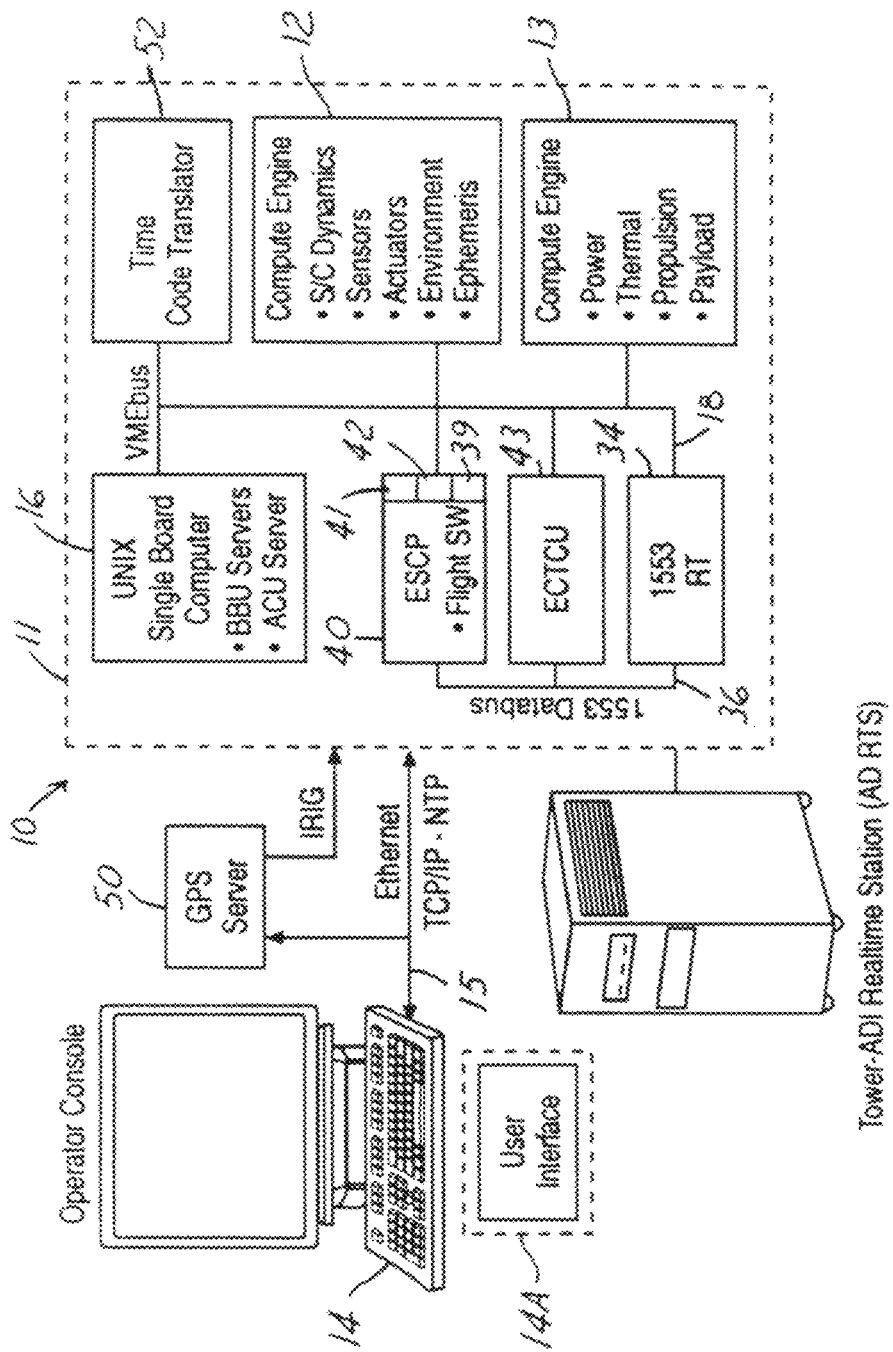
FIG. 1 is a block diagram of an embodiment of a real-time spacecraft simulation system in accordance with a preferred embodiment of the present invention.

FIG. 1 is a block diagram of a real-time spacecraft simulation system 10 in accordance with the present invention. The real-time spacecraft simulation system 10 can be embodied by an Applied Dynamics Real Time Station (AD RTS) 11 manufactured by Applied Dynamics. The AD RTS 11 system is a stand-alone VMEbus-based real-time simulation and analysis system which uses a mixture of 9 U×400 mm ADI or commercial off the shelf (COTS) processor and input/output cards. Physically, the AD RTS system can be contained in a mini-tower housing.

The real-time spacecraft simulation system 10 includes one or more simulation engines (SE) 12, 13 which are used to simulate system dynamics in real time. For an AD RTS system 11, the simulation engines 12, 13 are in the form of processor cards installed therein. Simulation engines 12,13 may both have a real time clock with a real time clock period.

Each simulation engine 12, 13 are a single board computer (SBC) that solves the dynamic equations of motion, power or heat transfer in real-time. One or more simulation engines can be installed in the real-time spacecraft simulation system as problem size and complexity increase throughput requirements. Each simulation engine 12, 13 has some form of a real-time clock that is derived from, an on-board oscillator that provides a means to meter simulation frames. In the preferred embodiment, the first simulation engine 12 hosts the simulation software that allows it to be used to model the dynamics associated with the attitude control subsystem (ACS) of the spacecraft. The ACS simulation engine 12 models dynamics, sensors and actuators along with environmental and orbital conditions. In a constructed embodiment, the simulation engine 12, was implemented in a MVME2604 SBC operating at 330 MHz.

In the preferred embodiment, the simulation engine 13 hosts the simulation software that allows it to be used to model non-ACS spacecraft subsystems, such as power, thermal, propulsion, and payload (power and thermal characteristics). In a preferred embodiment, the simulation engine is implemented in a MVME2604 SBC. However, the simulation engine may be embodied in a variety of other forms. The simulation modules 12, 13 are also preferably implemented in an ADI proprietary simulation language such as ADSIM.

A host computer 14 with an interface 14A is utilized for simulation development, cross-compiling, interfacing to a user, and displaying output information. The host computer 14 can be embodied by a computer workstation such as ones available from Sun, Hewlett-Packard, or VAX, for example. The host computer 14 runs simulation system software having interactive commands which provide simulation control and status. The simulation system software can be embodied by ADI SIMsystem software. The host computer 14 also utilizes a real-time plotting software package to provide strip chart and x-y plot capabilities. Such a real-time plotting package can be embodied by the SIMplot software package. Interface 14A provides the proper protocol to communicate with AD RTS 11.

The host computer 14 through interface 14A communicates with a VMEbus interactive manager (VIM) 16 through an Ethernet line or other communication line 15. The VIM 16 is operative to initialize and control the real-time spacecraft simulation system 10, download application software to the embedded processors in the real-time spacecraft simulation system 10, and monitor simulation parameters in real time. The VIM 16 is also operative to provide servers that simulate the TCP/IP servers of the ground station baseband unit (BBU) and antenna control unit (ACU). The VIM 16 resident servers provide bi-directional data transfer between the processors in the real-time spacecraft simulation system 10 and the ground segment status and control system (not shown) via an Ethernet 15 connection; spacecraft telemetry, ranging and positional data in one direction and spacecraft or unit command data in the other direction. The VIM 16 also contains software which supports the SIMsystem operating system. In a preferred embodiment, VIM 16 was constructed of a Motorola MVME2604 SBC with a Unix based operating system. The operating system maintains an independent calendar and clock function that is ultimately derived from an on-board oscillator.

The VIM 16 through the VMEbus 18 communicates telemetry and command data to the ECTCU 43 via the second simulation engine 14 which may contain interfacing software logic. The ECTCU 43 which is the 1553 databus bus controller, is a functional equivalent of the Central Telemetry and Command Unit (CTCU) bus controller element of the spacecraft. It contains non-flight versions of the CTCU flight components along with a customized version of the PROM sequencer firmware.

The ESCP 40 of the AD RTS system is a VMEbus-compatible card that emulates a Spacecraft Control Processor (SCP), hence the name ESCP. The ESCP 40 includes a microprocessor along with supporting circuitry to execute flight software. The ESCP 40 and the simulation engines 12, 13 are accessed to perform data transfers, and to provide/receive data to/from the VIM 16 for real-time data logging and user control. A plurality of ESCPs can be included to reflect the redundancy of operation systems.

The ESCP 40 has a master counter 39, including a master counter count, and a real-time clock 41 that are derived from an on-board oscillator. The real-time clock, in turn, is used to create a local clock 42. The master counter 39 master counter count is accessible to the simulation engines 12,13 and is used by them to gauge the bias and drift of the ESCP 40 oscillator and therefore, the real time clock and local clock. The real time clock is an electronic signal on the ESCP 40 that is used to synchronize and moderate time on the ESCP 40. The local clock 42 is derived from the real time clock and is the satellite local calendar time that is telemetered to the ground status and control system. As will be described below, the ESCP 40 local clock, the simulation engine 12,13 clocks and the operating system clock on the VIM 16 are all subject to drift and biasing which may in turn generate inaccurate data.

Alternative embodiments of the ESCP 40 include circuitry to support interfaces that cannot be implemented with the VMEbus 18 or the 1553 databus 36, such as a very fast interface or an analog interface.

The 1553 RT card 34 is used to imitate the various MIL STD 1553 remote terminals (RT) used on a 1553 databus 36 that correspond to MIL STD 1553 RTs on the spacecraft. Specifically, the 1553 RT card 34 imitates the hardware interface of respective bus and payload Remote Telemetry and Command Units (RTCUs), as well as, the Hemispherical Inertial Reference Unit. The 1553 RT card 34 is preferably a commercial card from SBS. The software logic controlling the 1553 RT card 34 may physically reside in the second simulation engine 14 and may be implemented in C or COSIM, which is another proprietary language from ADI. The 1553 RT card 34 is preferably coupled to the 1553 databus 36, an ECTCU bus controller 43, and an ESCP 40.

The VMEbus 18 is utilized for time, command, telemetry, sensor, and actuator interfacing. Actuator data is communicated from the ESCP 40 to the simulation engines 12 via the VMEbus 18. Sensor data is communicated from the simulation engine 12 to the ESCP 40 via the VMEbus 18. Telemetry data is communicated from the ESCP 40 to the host computer 14 via the VIM 16 and the VMEbus 18. Command data is communicated from the host computer 14 to the ESCP 24 via the VMEbus 18 and the VIM 16.

To obtain a highly accurate time source, in order to control time domain drift and bias, a device such as a stratum one server 50 and a time code translator 52 may be used within system 11. The server 50 may be coupled to communication line 50. The stratum one server acquires Universal Time from the GPS satellite constellation and thereby provides a time reference via a network time protocol (NTP) or with an TRIG time code signal. In a preferred embodiment, the TRIG data is transferred to a time code translator 52 via a dedicated interface 51. The time code translator 52 then makes Universal Time data available to the VIM 16, and simulation engines 12,13 via the VMEbus 18.

Alternative embodiments of the time source distribution can be accomplished with NTP via the Ethernet 15 to the VIM 16 or simulation engines 12, 13. Alternatively, as those skilled in the art would recognize, the system 11 may also incorporate a Stratum One Server card that would take the place of the external stratum one server 50 and translator 52.

Figure 2:
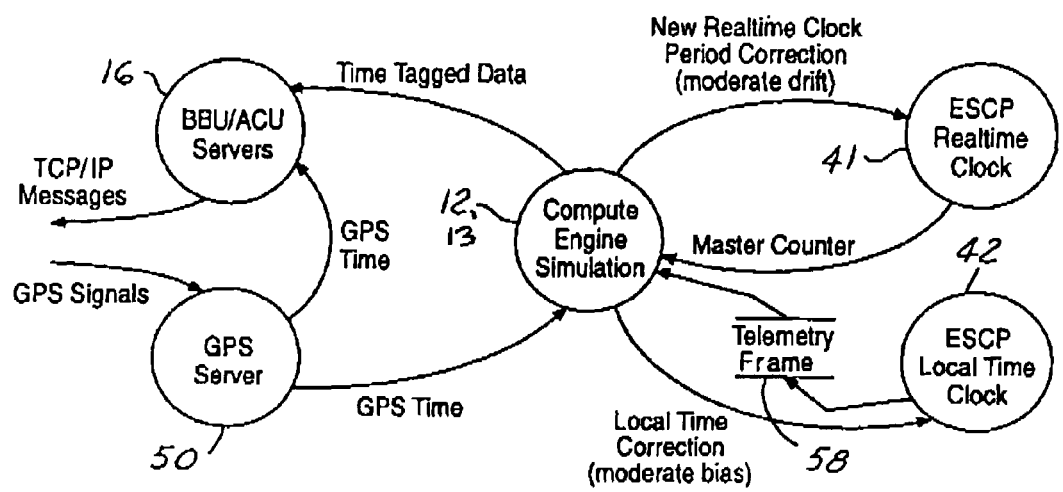
FIG. 2 is a data flow diagram of a real-time spacecraft simulation system in accordance with a preferred embodiment of the present invention.

FIG. 2 is a state diagram of the operation of the system. As illustrated, the compute engine is one of the simulation engines 12, 13. Preferably, simulation engine 12 is used which is the ACS simulation engine. The simulation engine 12 receives GPS Time data from the GPS Server 50 process (GPS receiver in this case) and also receives the Master Counter data from the master counter 39, which as shown, is contained within the ESCP Real Time Clock 41 process. The simulation engine also accesses the ESCP Local Time contained within the downlink Telemetry Frame 58 data store. Within the process labeled Compute Engine Simulation 12, the Master Counter and Local Time data are both passed through a low pass software filter, then integrated over time before they are compared to a corresponding GPS Time. A determination of the relative bias and drift is then made. The ESCP Realtime Clock 41 is then modified to eliminate drift or to match the drift rate preferred for the ESCP Clock 41. In the preferred embodiment, the countdown chain used to generate the Realtime Clock is modified accordingly. The ESCP Local Time Clock 42 is slewed over several telemetry frames in order to eliminate any bias or to allow for a fixed test bias.

In an alternative embodiment of the ESCP Realtime Clock 41 modification to correct for drift, the real time clock 41 may be slaved to the simulation (compute) engine 12 so that the real time period is determined by the simulation software not independently from the oscillators on board the ESCP 40.

The GPS Time data is also used by the ACS simulation engine 12 to correct any bias and drift in the simulation engine real time mechanism to assure that simulation frames are executed in precise real time. The modification is averaged and spread over several simulation frames to mitigate any destabilizing effects. Within the simulation engine 12, GPS Time data is also used to accurately timestamp telemetry frames, range data, and satellite azimuth/elevation data before they are passed on to the BBU and ACU Servers contained within the VIM 16.

In a preferred embodiment, the VIM 16 obtains GPS Time indirectly from the simulation engine 12 for the purpose of maintaining an accurate calendar on the Unix operating system. An alternative embodiment is to have the VIM 16 obtain GPS Time directly from the GPS Server 50.

The present invention improves the capability of the simulation system by correcting the timing of the system to mitigate drift and bias to an exceptional degree of accuracy. The time domain of the simulation engine is therefore tuned to a very high degree of fidelity and time critical testing is made possible while nominal testing of time critical control system is improved. This system is therefore more attractive as a deliverable to existing and potential customers who wish to have an on-site simulator.

While the best mode for carrying out the invention has been described in detail, those familiar with the art to which this invention relates will recognize various alternative designs and embodiments for practicing the invention as defined by the following claims.

What is claimed is:

1. A spacecraft emulation system comprising:
a central time source generating a time reference;
an emulated spacecraft control processor which contains an embedded processor that provides an emulated input/output interface to communicate simulated spacecraft data, wherein the embedded processor processes the simulated spacecraft data, and contains a real-time clock having a real-time clock period; and,
a first simulation engine that processes attitude control system data from the emulated spacecraft control processor to simulate an attitude control system of a spacecraft in real-time, the first simulation engine operative to produce sensor data for input to the emulated spacecraft control processor based on simulated system dynamics and adjusts the real-time clock period in response to the time reference.

2. The system of claim 1 further comprising a host computer which provides command data and receives telemetry data and time data from the emulated spacecraft control processor.

3. The system of claim 1, wherein the attitude control system data is communicated via a VMEbus.

4. The system of claim 3, further comprising a VMEbus interface manager which communicates command data, telemetry data and time between the VMEbus and a host computer.

5. The system of claim 1, wherein the first simulation engine and the emulated spacecraft control processor are housed in a single housing.

6. The system of claim 1 wherein the first simulation engine processes attitude control system data from the emulated spacecraft control processor to simulate an attitude control system of the spacecraft in real-time.

7. The system of claim 1 wherein the central time source comprises a GPS server.

8. A spacecraft simulation system housed in a single housing comprising:
   a central time source generating a time reference;
   an emulated spacecraft control processor which contains an embedded processor that provides an emulated input/output interface to communicate simulated spacecraft data, wherein the embedded processor processes the simulated spacecraft data and contains a master counter; and,
   a first simulation engine coupled to the time central time source and the emulated spacecraft control processor, the first simulation engine operative to produce data for input to the emulated spacecraft control processor based on simulated system dynamic, and adjusts a time parameter of a real-time clock in response to said master counter and said time reference, wherein the timer parameter comprises one of short-term bias and long-term drift.

9. The system of claim 8 wherein the first simulation engine processes attitude control system data from the emulated spacecraft control processor to simulate an attitude control system of a spacecraft in real-time.

10. The system of claim 8 further comprising a second simulation engine which processes power, thermal, propulsion and payload subsystem data from the emulated spacecraft control processor or ground computer to simulate power, thermal propulsion and payload subsystems of a spacecraft in real-time, the second simulation engine operative to produce data from the power, thermal, propulsion and payload subsystems for input to the emulated spacecraft control processor or ground computer based on simulated system dynamics.

11. The system of claim 10, wherein the power, thermal, propulsion and payload subsystem data includes simulated thermal command data, power command, propulsion command data, and payload command data.

12. The system of claim 8 wherein the central time source comprises a GPS generator.

13. A method of testing an embedded processor, the method comprising the steps of:
   providing an emulated spacecraft control processor that provides an emulated input/output interface;
   generating a master counter count in the emulated spacecraft control processor;
   generating a reference time from a central time source;
   receiving the master counter count and the reference time in a compute engine; and,
   determining a short term bias and a long term drift in response to the reference time and a master time counter count.

14. The method of claim 13 further comprising the step of adjusting a real-time clock in the emulated spacecraft control processor to compensate for short term bias and long term drift.

15. The method of claim 13 further comprising the step of adjusting a local time clock in the emulated spacecraft control processor to compensate for short term bias and long term drift.

16. The method of claim 13 wherein the step of determining comprises the step of filtering the master counter count of the compute engine.

17. The method of claim 13 further comprising the step of modifying a time frame of the compute engine.

18. The method of claim 13 further comprising the step of slaving a real-time clock of the compute engine.

19. The method of claim 13 further comprising the step of time stamping data from a simulation engine with the reference time from the central time source.

* * * * *